US012691775B2

(12) United States Patent
Farkas et al.

(10) Patent No.: US 12,691,775 B2
(45) Date of Patent: Jul. 28, 2026

(54) METHOD AND DEVICE FOR AUTONOMOUSLY PLUGGING A CHARGING PLUG INTO A CHARGING SOCKET OF A VEHICLE

(71) Applicant: VOLKSWAGEN AKTIENGESELLSCHAFT, Wolfsburg (DE)

(72) Inventors: Zsolt Farkas, Wolfsburg (DE); Daniel Schulze, Braunschweig (DE); Maxim Derksen, Wolfsburg (DE); Lisa Rangosch, Königslutter (DE); Peter Motzko, Schöppenstedt (DE); Robert Schirmer, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 303 days.

(21) Appl. No.: 18/707,793

(22) PCT Filed: Oct. 21, 2022

(86) PCT No.: PCT/EP2022/079360
§ 371 (c)(1),
(2) Date: May 6, 2024

(87) PCT Pub. No.: WO2023/078697
PCT Pub. Date: May 11, 2023

(65) Prior Publication Data
US 2026/0167035 A1     Jun. 18, 2026

(30) Foreign Application Priority Data
Nov. 5, 2021     (DE) .................... 10 2021 212 484.4

(51) Int. Cl.
*B60L 53/38*          (2019.01)
*B25J 9/16*           (2006.01)
(Continued)

(52) U.S. Cl.
CPC ............. *B60L 53/38* (2019.02); *B25J 9/1687* (2013.01); *B25J 9/1697* (2013.01);
(Continued)

(58) Field of Classification Search
CPC .... B25J 9/1687; B25J 9/1697; B25J 15/0019; B60L 53/37; B60L 53/38; G06T 7/50;
(Continued)

(56) References Cited

U.S. PATENT DOCUMENTS 11,577,621 B2     2/2023     Brendel et al.
11,745,606 B2     9/2023     Schoob et al.
(Continued)

FOREIGN PATENT DOCUMENTS

CN          109435730 A     3/2019
CN          111619388 A     9/2020
(Continued)

OTHER PUBLICATIONS

Miseikis, Justinas, et al. "3D vision guided robotic charging station for electric and plug-in hybrid vehicles." arXiv preprint arXiv: 1703.05381 (2017). (Year: 2017).*
(Continued)

*Primary Examiner* — Dale Moyer
(74) *Attorney, Agent, or Firm* — BARNES & THORNBURG LLP

(57)          ABSTRACT

Autonomously plugging a charging plug installed on a programmable robot arm into a charging socket of a transportation vehicle. The method includes a camera to locate the charging socket by image analysis of acquired images of the charging socket; determining pose data to determine a pose of the located charging socket using a PnP algorithm; moving the charging plug to an intermediate position; creating a depth image of the charging socket corresponding to the current position of the charging plug when the charging
(Continued)

plug is in the intermediate position; performing a comparison between the determined depth image and a reference depth image corresponding to a reference position to determine a positional deviation between the current position of the charging plug and the reference position; moving the charging plug to a plug-in position; and plugging the charging plug into the charging socket from the plug-in position.

17 Claims, 5 Drawing Sheets

(51) Int. Cl.
  *B25J 15/00*  (2006.01)
  *B60L 53/37*  (2019.01)
  *G06T 7/50*  (2017.01)
  *G06T 7/73*  (2017.01)
(52) U.S. Cl.
  CPC ........... *B25J 15/0019* (2013.01); *B60L 53/37* (2019.02); *G06T 7/50* (2017.01); *G06T 7/73* (2017.01); *G06T 2207/20084* (2013.01); *G06T 2207/30248* (2013.01)
(58) Field of Classification Search
  CPC ............. G06T 7/73; G06T 2207/20084; G06T 2007/30248
  See application file for complete search history.

(56) References Cited

U.S. PATENT DOCUMENTS

| | | | |
|---|---|---|---|
| 2018/0001777 | A1 | 1/2018 | Kilic |
| 2018/0056801 | A1* | 3/2018 | Leary .................. G06V 10/255 |
| 2019/0340782 | A1 | 11/2019 | Sinha et al. |
| 2023/0102948 | A1* | 3/2023 | Lee ........................ B25J 9/1697 |
| | | | 700/259 |
| 2024/0246438 | A1* | 7/2024 | van Deurzen .......... B60L 53/36 |

FOREIGN PATENT DOCUMENTS

| | | |
|---|---|---|
| DE | 102014226357 A1 | 6/2016 |
| DE | 102017009237 A1 | 4/2018 |
| DE | 102017205594 A1 | 10/2018 |
| DE | 102018104759 A1 | 9/2019 |

OTHER PUBLICATIONS

Eser, Ali Yasin; ArUco Marker Tracking with OpenCV; Jun. 27, 2020; downloaded from https://aliyasineser.medium.com/aruco-marker-tracking-with-opencv-8cb844c26628; downloaded Apr. 30, 2024.

Du et al.; Vision-based Robotic Grasping From Object Localization, Object Pose Estimation to Grasp Estimation for Parallel Grippers: A Review; Artificial Intelligence Review; Aug. 17, 2020; pp. 1677-1734; vol. 54, No. 3.

Quan et al.; Research on Fast Identification and Location of Contour Features of Electric Vehicle Charging Port in Complex Scenes; IEEE Access, Jun. 13, 2021; pp. 26702-26714; vol. 10.

Search Report; International Patent Application No. PCT/EP2022/079360; Feb. 20, 2023.

* cited by examiner

METHOD AND DEVICE FOR AUTONOMOUSLY PLUGGING A CHARGING PLUG INTO A CHARGING SOCKET OF A VEHICLE

PRIORITY CLAIM

This patent application is a U.S. National Phase of International Patent Application No. PCT/EP2022/079360, filed 21 Oct. 2022, which claims priority to German Patent Application No. 10 2021 212 484.4, filed 5 Nov. 2021, the disclosures of which are incorporated herein by reference in their entireties.

SUMMARY

Illustrative embodiments relate to a method for autonomously plugging a charging plug into a charging socket of a transportation vehicle, wherein the charging plug is installed on a programmable robot arm of a charging station. The illustrative embodiments also relate to an apparatus and a computer program product for performing the process as well as a computer-readable storage medium on which such a computer program product is stored.

BRIEF DESCRIPTION OF THE DRAWINGS

Exemplary embodiments are described below with reference to drawings, in which.

DETAILED DESCRIPTION

Figure 1:
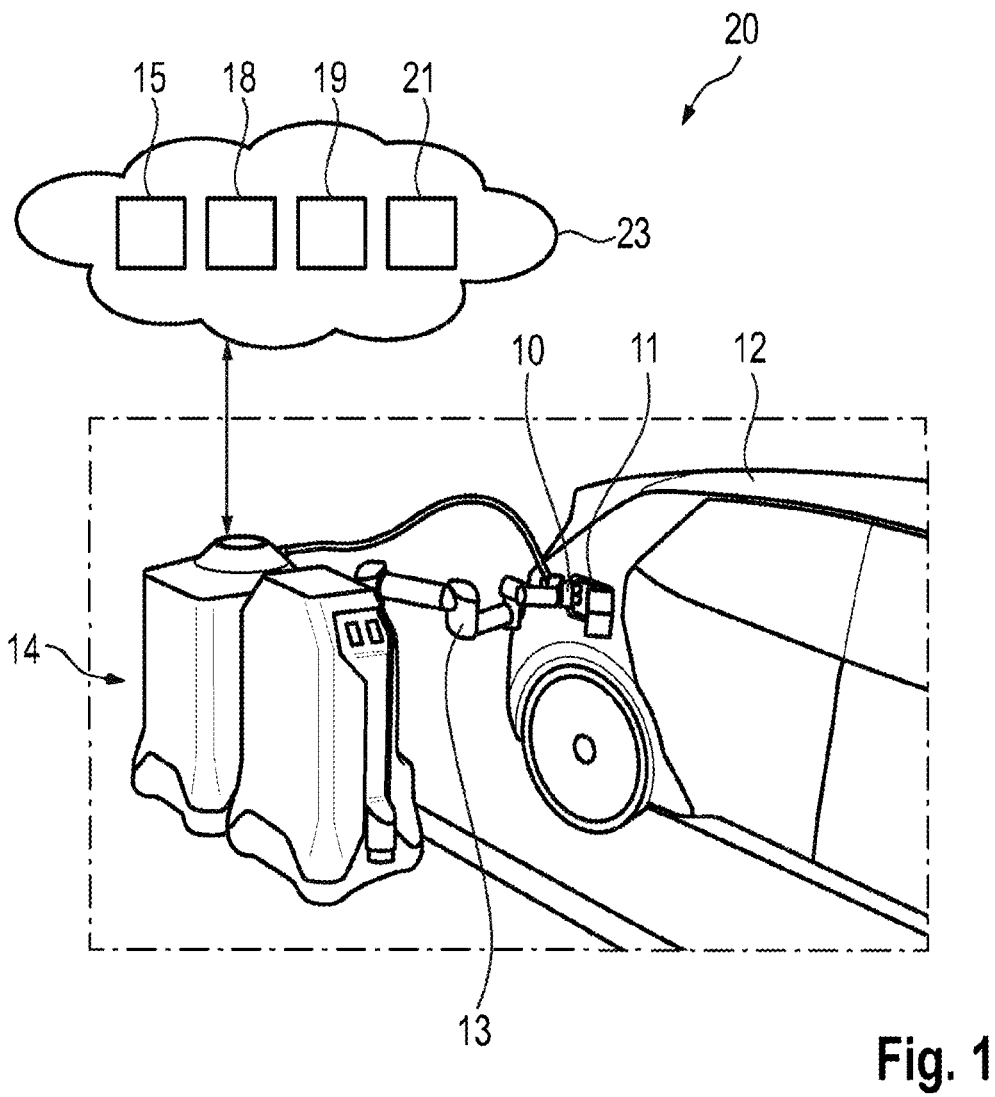
FIG. 1 schematically shows an apparatus for autonomously plugging a charging plug into a charging socket of a transportation vehicle according to an exemplary embodiment.

In addition to self-driving electric transportation vehicles, charging systems for autonomous charging of electric vehicles are now known in the prior art. In addition to stationary charging systems, mobile charging robots are also known, but most of them are currently still in the development phase. The charging robots can be started via an app or, for example, via Car-to-X communication, establishing communication with the transportation vehicle and/or a network such as the Internet. From opening the charging flap to connecting the plug to uncoupling—the entire charging process can now be carried out without human involvement.

A current challenge is to plug the charging plug into the charging socket as quickly, reliably and without damage as possible. First of all, it helps that the charging sockets and charging plugs are usually standardized. Another tool to achieve the smoothest possible plug-in process is to position markers on the charging socket, which creates another reference point and allows camera systems to better orient themselves to the charging plug. For future charging processes, however, position markers should be avoided as far as possible, as the visibility of the markers may be hindered by snow or wear, for example. In addition, position markers cannot be processed by every loading system and, depending on a camera and/or software system used, only certain position markers can be used. In other respects, too, modification of the charging socket should be avoided as far as possible.

In the patent application US 2018/0056801 A1 a system for autonomous charging of a vehicle is described in which a charging socket is localized based on a camera. During the localization, various measurement data are also evaluated via a cloud system to determine the most accurate position of the charging socket for plugging the charging plug into the charging socket. Another charging system is described in the patent application CN 111619388 A. According to this Chinese patent specification, in addition to a camera system, a cloud-based neural network is used to detect the charging socket. Nevertheless, there is still room for improvement with regard to the detailed execution of the charging process.

Disclosed embodiments take account the problems described above, at least in part. In particular, the disclosed embodiments provide a method as well as an apparatus by which a charging plug can be plugged into a charging socket of a transportation vehicle as quickly, easily and reliably as possible in an autonomous manner.

Features that are described in connection with the method also apply in connection with the disclosed apparatus, the disclosed computer program product, the disclosed storage medium and vice versa in each case, so that with regard to the disclosure for the individual features of the disclosed embodiments there is always and/or can be a reciprocal reference.

According to a first disclosed embodiment, a method for autonomously plugging a charging plug into a charging socket of a transportation vehicle is proposed, with which the charging plug is installed on a programmable robot arm of a charging station. The method includes:

camera-based localization of the charging socket by an image analysis of created images of the charging socket, based on the analyzed images, obtaining pose data to determine a pose of the localized charging socket using a PnP algorithm, based on the determined pose data, moving the charging plug to an intermediate position, when the charging plug is in the intermediate position, creating a depth image of the charging socket corresponding to the current position of the charging plug, performing a comparison between the determined depth image and a reference depth image corresponding to a reference position to determine a positional deviation between the current position of the charging plug and the reference position, based on the determined positional deviation, moving the charging plug to a plug-in position at a distance from the charging socket, and plugging the charging plug into the charging socket from the plug-in position.

By the disclosed combination of the camera-based localization of the charging socket, the PnP algorithm for the rough estimation of the pose of the charging socket and the use of the depth image information to refine the pose or a corresponding calculation result, the pose of the charging socket can be determined in a relatively fast, simple and reliable way. In particular, the rough estimation of the pose can initially be carried out with relatively low computing power and correspondingly quickly and efficiently through the camera-based localization of the charging socket as well as the complementary use of the PnP algorithm. As a result, the intermediate position can also be calculated relatively quickly and approached with the charging plug. Only after the charging plug is sufficiently close to the charging socket is the pose or plug-in position to be determined specified by the comparison between the determined depth image and the reference depth image. This means that the required computing power can be kept relatively low overall.

The camera-based localization of the charging socket can be understood as a recognition of the charging socket by a camera system, by which the images are created or recorded. That is, using a camera, at first only the presence of the charging socket is found out. Data and/or information about the pose of the charging socket are not yet determined or only very roughly. Nevertheless, the images can already be analyzed and/or evaluated by an image analysis tool and thus prepared for use in the subsequent determination of the pose data. This means that the images and/or corresponding image data can be prepared by image analysis for the subsequent determination of the pose data or the associated pose. In the present case, the pose of the charging plug can be understood as a position and alignment or orientation of the charging plug in three-dimensional space. A pose can therefore include a position in the x-direction, in the y-direction and in the z-direction, as well as an orientation in terms of a roll angle, a pitch angle and a yaw angle.

The PnP algorithm is a projective n-point algorithm, i.e., a mathematical model for determining and/or estimating the pose of the charging socket on the basis of predefined, determined and/or read-out pixels on the images. The pixels used for the PnP algorithm can be determined as part of the image analysis. The images of the charging socket are images taken by a camera system of the charging socket and the surroundings of the charging socket. The pose data include the data, in particular, the spatial coordinates and angles, by which the pose will be or is defined. The images can also be understood as images of a digital map, in particular, an octomap, according to which the surroundings of the charging station are digitized with a large number of small cubes. Images of the camera system for locating the charging socket can also be converted into images of a digital map for positioning the charging plug or for moving the charging plug to the intermediate position and/or to the plug-in position, and can be used accordingly in the context of the disclosed method.

The determination of the pose data or the pose can be carried out continuously, especially while moving the charging plug to the intermediate position or at least to an intermediate position. As part of the method, the pose and the associated pose data are calculated on a regular basis, optionally with a predefined and/or pre-definable frequency. Based on the calculated pose data, the charging plug can be moved to different and/or multiple intermediate positions to incrementally approach the charging socket. In other words, the transition from an initial rough approach of the charging plug to the charging socket using a PnP algorithm to a finer approach using depth image information does not have to take place after adoption of the first or a single intermediate position of the charging plug.

The depth image can be created by a suitable camera system, especially a stereoscopic camera system or a 3D camera system, optionally mounted on the robot arm. The depth image is an image with depth information. The reference depth image can be read from local storage or from network storage over a network, such as the Internet. That is, the reference depth image is or was taken before the depth image. The reference depth image is or has been taken from a fixed distance and/or from a fixed position relative to the charging connector. The position from which the reference depth image is taken or created is chosen in such a way that the charging plug can be plugged into the charging socket by a permanently programmed or programmable movement of the robot arm. To create the reference depth image, for example, the charging plug can be plugged into the charging socket and then unplugged linearly and moved away or moved out from the charging socket by a predefined or predefinable value, for example, in a range between 10 cm and 40 cm. Based on the determined pose data, the charging plug can be moved towards the charging socket to or at least intermediate position. Based on the determined positional deviation, the charging plug may be moved from this position or from an intermediate position to the plug-in position. The plug-in position may be closer to the charging socket than the intermediate position from which the charging plug is moved to the plug-in position.

The fact that the charging plug is moved to the intermediate position based on the determined pose data can be understood to mean that the charging plug is moved to the intermediate position taking into account the pose data and/or using the pose data for a motion calculation. The fact that the charging plug is moved to the plug-in position at a distance from the charging socket based on the determined positional deviation can be understood as moving the charging plug into the plug-in position at a distance from the charging socket, taking into account the positional deviation and/or using deviation data corresponding to the positional deviation.

The transportation vehicle may be a road vehicle, such as a passenger car or a truck, in particular, an electric vehicle with a traction battery. The transportation vehicle can also be understood as a corresponding watercraft, a rail vehicle or a robot with a traction battery.

According to a further exemplary embodiment, it is possible that in method the image analysis is carried out by a neural network pre-trained on the charging socket. By using a neural network that has been pre-trained on the charging socket, it is possible for the charging socket to be detected quickly and reliably without position and/or orientation markers. There is no need for a visual modification of the charging socket and/or a charging socket area. Here predefined position features on the charging socket may be detected by the neural network to detect the charging socket. This means that the pre-trained neural network can be used to detect predefined position features on the charging socket or on the images of the charging socket, which can then be used to determine, in particular, calculate, the pose of the charging socket using a PnP algorithm. In particular, the neural network is provided or used as a so-called residual neural network for keypoint detection. As described above, the detected keypoints or position features can also subsequently be used to determine the pose using a PnP algorithm. This means that with the help of the pre-trained neural network, the charging socket can be detected quickly, easily and reliably on the basis of prominent points on the charging socket. For this purpose, the neural network can be or is pre-trained for a specific charging socket and/or a standardized charging socket and, in particular, predefined position characteristics of the charging socket. However, it is also possible that the neural network will be or is pre-trained on various similar charging sockets. As part of the camera-based localization of the charging socket, the charging socket can be detected by the camera at a predefined or predefinable frequency, whereby corresponding images are generated. These images are continuously analyzed with reference to the predefined position features using the pre-trained neural network. The images analyzed or evaluated in this way can also be evaluated using the PnP algorithm to determine the pose of the charging socket.

Furthermore, it is possible that with a disclosed method the pose is determined by additional averaging of the pose data. In tests within the scope of the present disclosure, it has been shown that an improvement in or greater precision of the estimation can be achieved by the additional averaging of the pose data. The additional averaging can be performed continuously while applying or using the PnP algorithm. This means that using the PnP algorithm, pose data can be calculated multiple times and/or continuously, which can be expanded accordingly by the additional averaging, so that the respective pose can be determined or calculated on an even larger database. Consequently, by averaging several estimates and/or pose values from different poses using the PnP algorithm, a continuous refinement of the subsequent pose can be made possible. The charging plug can be continuously and/or incrementally brought closer to the charging socket.

With a disclosed method, it is also possible for a reference depth image taken from a predefined distance and/or position relative to the charging socket to be used as a reference depth image. The predefined distance may be in a range between 10 cm and 40 cm, especially in a range between 20 cm and 30 cm. Tests carried out within the scope of the present disclosure have shown that plugging in from this distance can be carried out reliably by linear movement of the charging plug. A plug-in position closer to the charging socket would increase the risk of an unwanted collision with the transportation vehicle and/or the charging socket. A plug-in position further away from the transportation vehicle would delay the plugging in process and make it more error-prone, as well as increase the computational effort.

In addition, it is possible that with a disclosed method the positional deviation is determined using an ICP algorithm. Using the ICP algorithm, the positional deviation and the resulting displacement or movement of the charging plug from the intermediate position to the plug-in position can be carried out particularly precisely. The ICP algorithm is an iterative closest point algorithm. Using the ICP algorithm, fine positioning can be ensured with consistent positioning results. In particular, the ICP algorithm builds on the previously performed averaging. Tests within the scope of the disclosure have shown that the combination of the described averaging with the ICP algorithm enables a particularly precise positioning of the charging plug in an efficient way.

The environment of the charging station can be digitized by a disclosed method, such as a digital map including a charging socket area in which the charging socket is located, wherein the digital map is modified into a modified digital map without the charging socket area and the plugging of the charging plug into the charging socket is carried out based on the modified digital map. With the help of the modified digital map, it is possible for the plugging in to be carried out particularly quickly and with a relatively low computational effort. The risk of a possible mechanical contact of the charging plug on the transportation vehicle next to the charging socket can therefore be accepted, as this case is relatively unlikely during plugging in. The fact that the digital map is modified into a modified digital map without the charging socket area can be understood as the use of a modified digital map from which the charging socket area is or has been removed. This means that in the modified digital map, there are no voxels and/or no digitization of the environment in the charging socket area. In other words, there may be a data hole and/or a correspondingly empty area in the charging socket area. The digital map may be provided as an octomap. This means that the environment of the charging station can be created and/or provided as an octomap. The charging socket area is an area in the digital map in which at least the charging socket and, if applicable, an edge area near the charging socket is or are or would be located. Modifying the digital map for the plugging in process can be performed by a processing unit.

According to another disclosed embodiment, an apparatus for autonomously moving and plugging a charging plug into a charging socket of a transportation vehicle is proposed according to a method described in detail above. The apparatus contains:

a charging station with a programmable robot arm on which the charging plug is installed, a camera system mounted on the robot arm for camera-based localization of the charging socket and for creating the depth image of the charging socket, a computational unit for determining the pose data for determining the pose of the localized charging socket using the PnP algorithm, and a comparison unit for performing the comparison between the determined depth image and the reference depth image corresponding to a reference position to determine the positional deviation between the current position of the charging plug and the reference position.

Thus, the disclosed apparatus has the same benefits as have been described in detail with reference to the disclosed method. The camera system may have a camera mounted on the robot arm in a predefined position and orientation to the charging plug. This means that a relative movement between the camera and the charging plug should be prevented to ensure that the plugging in process is as precise as possible. To obtain the depth information or the depth image, the camera may be designed as a stereo RGB camera, but can also be configured as a 3D camera. The computing unit and the comparison unit can be or will be provided locally, for example, based on a vehicle control unit and/or decentrally, in particular, cloud-based on the Internet.

The charging station may be a mobile charging station. This means that the charging process and, in particular, plugging the charging plug into the disclosed charging socket can be performed particularly flexibly. In principle, the transportation vehicle does not have to park in a predefined position at the charging station and/or towards the charging station. In principle, the orientation of the transportation vehicle to the charging station can also be chosen as desired. In particular, a mobile charging station can be understood as a self-driving and/or autonomously driving or moving charging station.

According to another disclosed embodiment, a computer program product is proposed which includes instructions which cause the apparatus described above to perform the process operations explained. Furthermore, a computer-readable storage medium on which such a computer program product is stored is proposed. Thus, the disclosed computer program product and the disclosed storage medium also have the benefits described above. The storage medium may be provided as a non-volatile storage medium.

The computer program product can be implemented as a computer-readable instruction code in any appropriate programming language and/or machine language such as JAVA, C++, C # and/or Python. The computer program product may be stored on a computer-readable storage medium such as a data disk, removable drive, volatile or non-volatile memory, or built-in memory/processor. The instruction code can program a computer or other programmable device, such as a control unit, to perform the desired functions. In addition, the computer program product may be on and/or provided on a network, such as the Internet, from which it can be downloaded by a user if necessary. The computer program product can be realized by software as well as by one or more special electronic circuits, i.e., in hardware or in any hybrid form, i.e., by software components and hardware components.

Further features can be found in the following description of various exemplary embodiments of the disclosure, which are schematically shown in the figures. All features arising from the claims, description or figures, including design details and spatial arrangements, may be essential to the disclosed embodiments both on their own and in the various combinations.

Elements with the same function and/or mode of action are each provided with the same reference signs in the figures.

FIG. 1 shows an apparatus 20 for autonomously moving and plugging a charging plug 10 into a charging socket 11 of a transportation vehicle 12. The apparatus 20 comprises a mobile charging station 14 with a programmable robot arm 13 on which the charging plug 10 is installed. To be more precise, the charging station 14 is provided as an autonomously mobile charging station 14, which can communicate wirelessly with the transportation vehicle 12 via Car-to-X and is connected to the Internet. In addition, a camera system 17 indicated in FIGS. 8 and 9 or a corresponding camera for camera-based localization of the charging socket 11 as well as for the creation of depth images or images with depth information of the charging socket 11 and an environment of the charging socket 11 is mounted on the robot arm 13.

Figure 2:
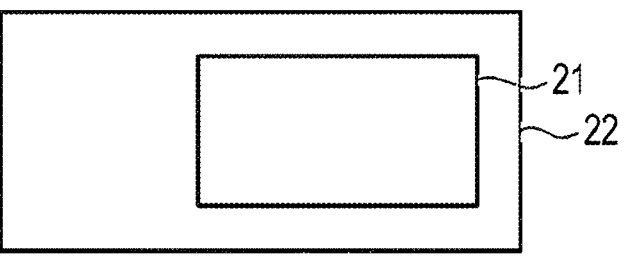
FIG. 2 schematically shows a storage medium with a computer program product stored on the storage medium according to an exemplary embodiment.

In a cloud 23 that can be accessed via the Internet, a computational unit 18 is provided for determining the pose data for determining the pose of the localized charging socket 11 using the PnP algorithm, and a comparison unit 19 is provided for performing the comparison between the determined depth image and the reference depth image corresponding to a reference position to determine the positional deviation between the current position of the charging plug 10 and the reference position. A neural network 15 and a computer program product 21 can also be accessed via the cloud 23 or in the cloud 23. The computer program product 21 contains instructions which cause the apparatus shown in FIG. 1 to perform the method that is described below with further reference to FIGS. 3 to 10. As shown in FIG. 2, the computer program product 21 can also be stored on a portable storage medium 22. The storage medium 22 is configured as a computer-readable, non-volatile storage medium 22.

Figure 3:
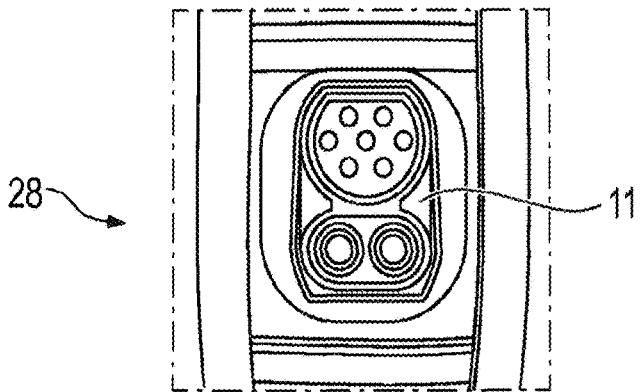
FIG. 3 schematically shows a disclosed method for autonomously plugging a charging plug into a charging socket according to a first exemplary embodiment.

With reference to FIGS. 1 and 3 to 6, a method for autonomously plugging the charging plug 10 into the charging socket 11 according to a first exemplary embodiment is then explained. For this purpose, the charging socket 11 is first localized accordingly on a camera basis by image analysis of created images 28 of the charging socket 11, which are and/or have been recorded by the camera system 17. A charging socket 11 localized by the camera system 17 is shown in FIG. 3.

Figure 4:
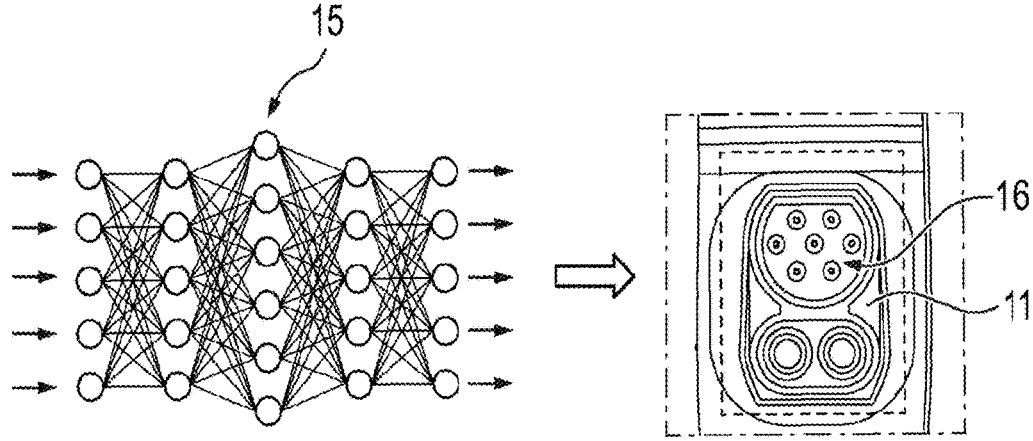
FIG. 4 schematically shows a disclosed method for autonomously plugging a charging plug into a charging socket according to another exemplary embodiment.
Figure 5:
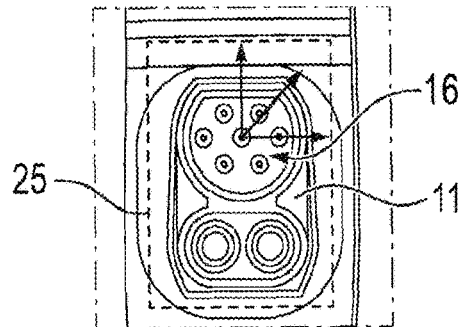
FIG. 5 schematically shows a disclosed method for autonomously plugging a charging plug into a charging socket according to yet another exemplary embodiment.

As shown in FIG. 4, the image analysis is performed by a neural network 15 pre-trained on position features 16 of the charging socket 11. By the neural network 15, pre-trained position features or keypoints on the charging socket 11 are recognized as part of the image analysis. Based on the images 28 thus analyzed, pose data are obtained using a PnP algorithm to determine a pose of the localized charging socket 11, as shown in FIG. 5. Based on the determined pose data, the charging plug 10 is moved to an intermediate position. The method described with reference to FIGS. 4 and 5 are performed multiple times, while the charging plug 10 is guided closer and closer to the charging socket 11 via multiple intermediate positions. The pose or the respective poses are determined by additional averaging of the pose data.

Figure 6:
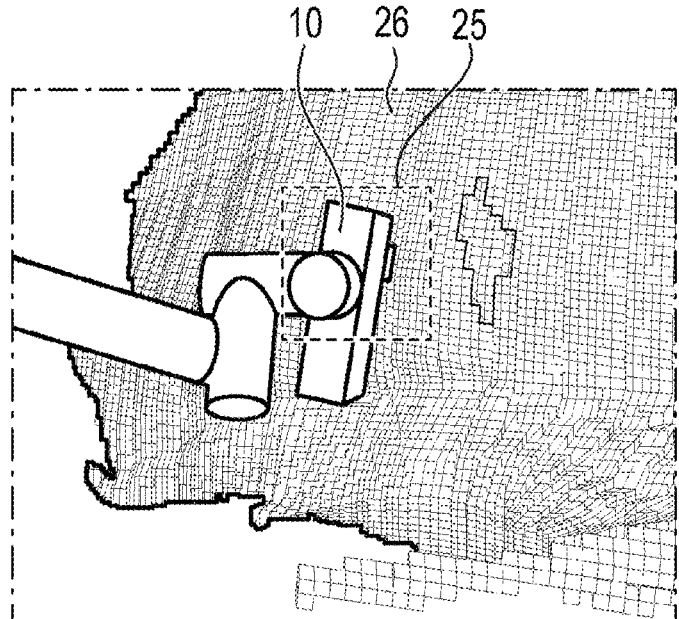
FIG. 6 schematically shows a disclosed method for autonomously plugging a charging plug into a charging socket according to a further exemplary embodiment.

Once the charging plug 10, as shown in FIG. 6, reaches a predefined or pre-definable intermediate position, which is close enough to or at a predefined or predefinable distance from the charging socket 10, a depth image of the charging socket 11 corresponding to the current position of the charging plug 10 is created by the camera system 17. Subsequently, a comparison or a corresponding calculation is performed between the determined depth image and a reference depth image corresponding to a reference position to determine a positional deviation between the current position of the charging plug 10 and the reference position. The reference depth image was taken in advance from a predefined distance and orientation to the charging socket 11 and is read out from a memory for the calculations. In the example shown, the reference position is 25 cm away from the charging socket 11 or in a position in which the charging plug 10 is at a distance of 25 cm from the charging socket 11. The positional deviation is determined using an ICP algorithm. Based on the determined positional deviation, the charging plug 10 is then moved to a plug-in position that is located at a distance from the charging socket 11. As shown in FIG. 1, the charging plug 10 is then plugged linearly or straight into the charging socket 11 from the plug-in position.

Figure 7:
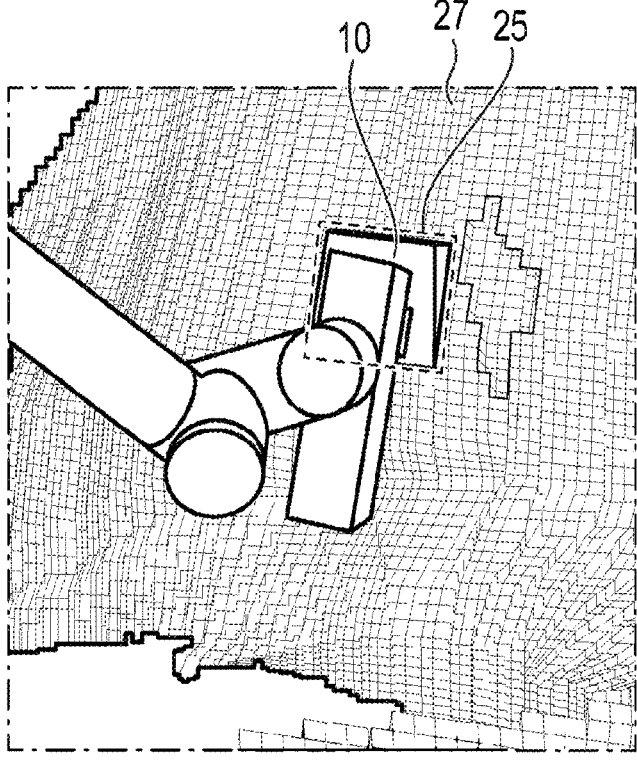
FIG. 7 schematically shows a disclosed method for autonomously plugging a charging plug into a charging socket according to a second exemplary embodiment.

With reference to FIGS. 1 and 7 to 10, a method for plugging the charging plug 10 into the charging socket 11 according to a second exemplary embodiment or a possible extension of the first exemplary embodiment is then explained. The method starts with the operation shown in FIG. 6 of plugging the charging plug 10 into the charging socket 11 from the plug-in position. In this regard, it should be mentioned that by the camera system 17, the environment of the charging station 14 is digitized as a three-dimensional digital map 26, more precisely as an octomap, including a charging socket area 25 in which the charging socket 11 is located. If the charging plug 10 is now in the plug-in position, the digital map 26 is modified into a modified digital map 27 without the charging socket area 25. This means that the voxels or cubes of the charging socket area 25 are removed from the original digital map 26. A correspondingly modified digital map 27 with a charging plug 10 in the plug-in position is shown in FIG. 7. Using the modified digital map 27, the charging plug 10 is now plugged into the charging socket 11. During plugging in, the modified digital map 27 can be modified even further. It is also possible that the modification of the original digital map 26 is only carried out during a plugging in movement.

Figure 8:
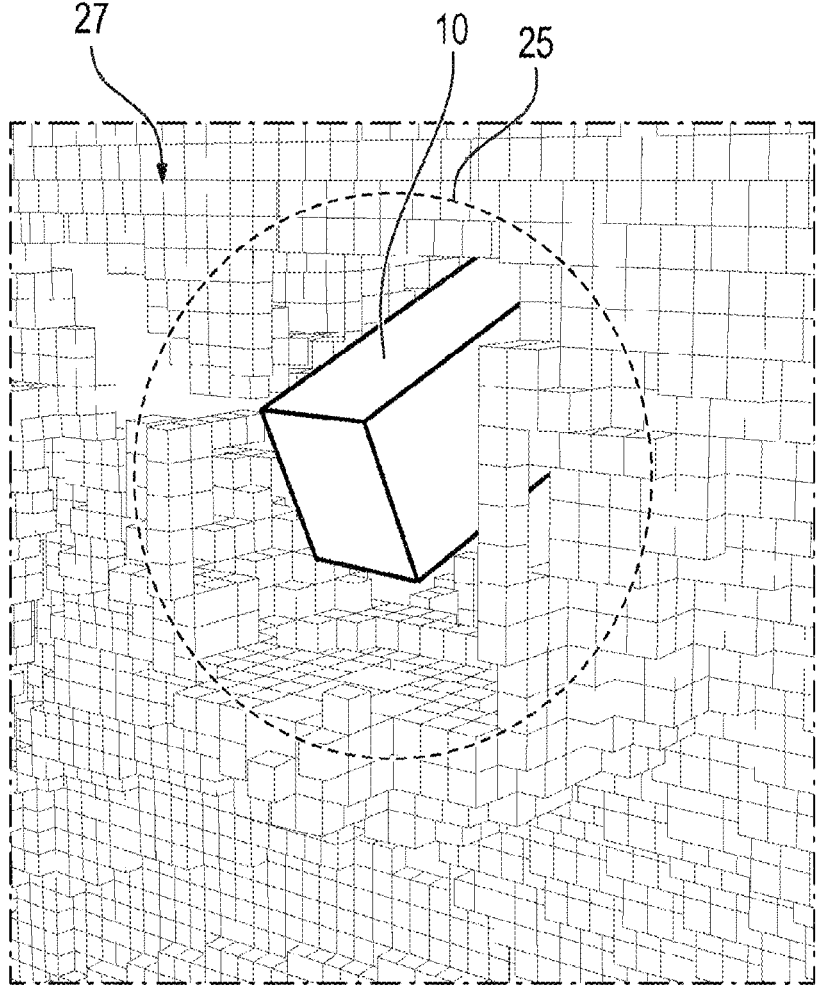
FIG. 8 schematically shows a disclosed method for autonomously plugging a charging plug into a charging socket according to another exemplary embodiment.
Figure 9:
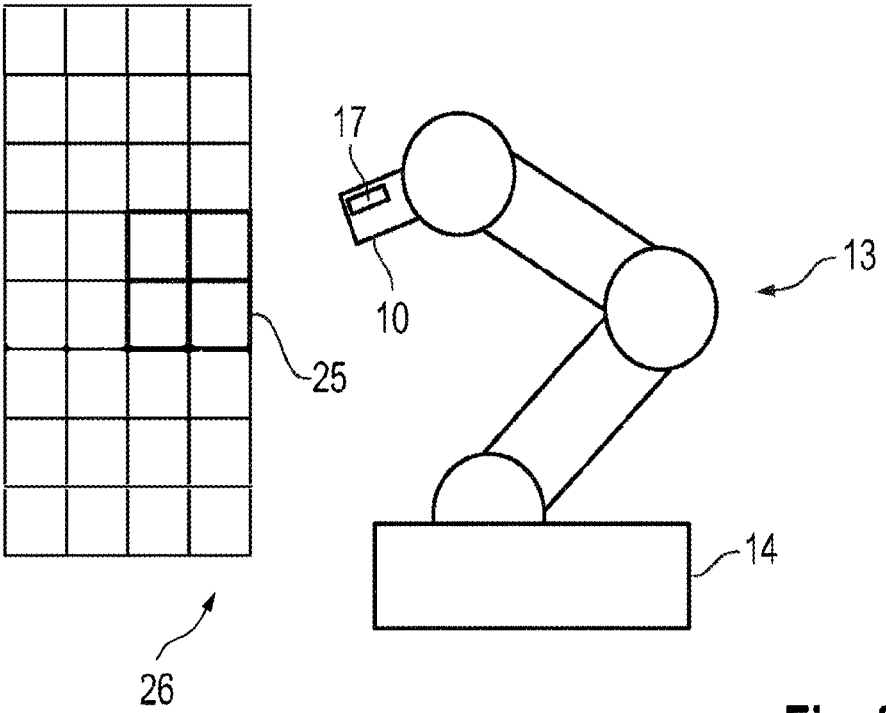
FIG. 9 schematically shows a disclosed method for autonomously plugging a charging plug into a charging socket according to yet another exemplary embodiment.
Figure 10:
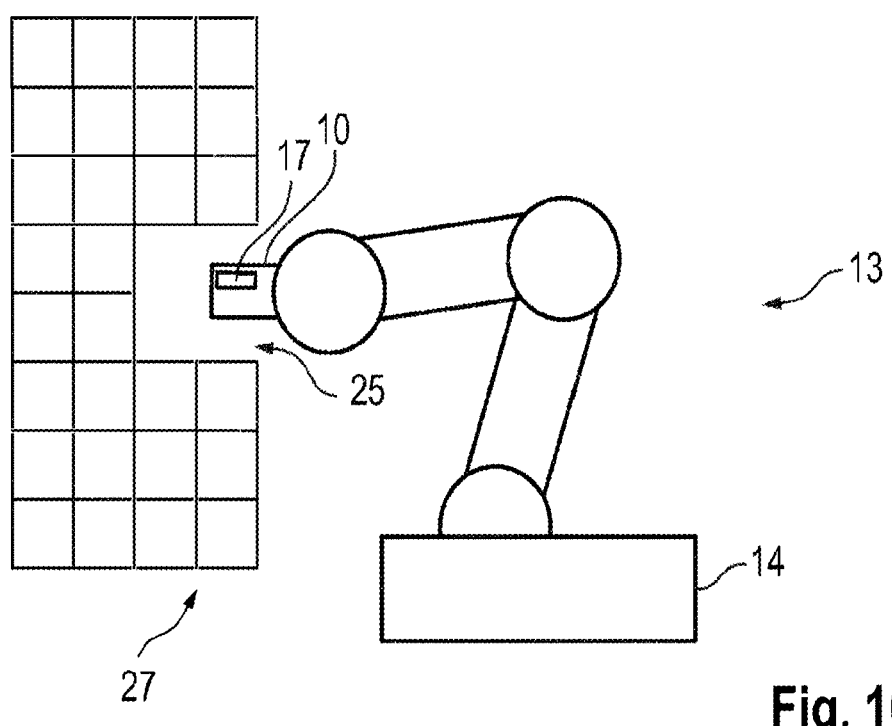
FIG. 10 schematically shows a disclosed method for autonomously plugging a charging plug into a charging socket according to a further exemplary embodiment.

FIG. 8 shows the charging plug 10, which is located in the charging socket area 25 of the modified digital map 27, in outline. In FIGS. 9 and 10, the method is further simplified according to the second exemplary embodiment.

In addition to the exemplary embodiments illustrated, the disclosure allows further design principles. This means that the disclosure should not be considered limited to the exemplary embodiments explained with reference to the figures.

REFERENCE SIGN LIST

10 Charging plug
11 Charging socket
12 Transportation Vehicle
13 Robot arm
14 Charging station
15 Neural network
16 Position characteristics
17 Camera system
18 Computational unit
19 Comparison unit
20 Apparatus
21 Computer program product
22 Storage unit
23 Cloud
25 Charging socket area
26 Digital map
27 Modified digital map
28 Image

The invention claimed is:

1. A method for autonomously plugging a charging plug into a charging socket of a transportation vehicle, wherein the charging plug is installed on a programmable robot arm of a charging station, the method comprising:
camera-based localization of the charging socket by image analysis of images of the charging socket;
obtaining pose data based on the analyzed images to determine a pose of the localized charging socket using a PnP algorithm;
moving the charging plug to an intermediate position based on the determined pose data;
creating a depth image of the charging socket indicating a current position of the charging plug when the charging plug is in the intermediate position;
performing a comparison between the determined depth image and a reference depth image corresponding to a reference position to determine a positional deviation between the current position of the charging plug and the reference position;
moving the charging plug to a plug-in position from the current position of the charging plug based on the determined positional deviation so as to plug the charging plug into the charging socket.

2. The method of claim 1, wherein the image analysis is performed by a neural network pre-trained using data on position features of the charging socket.

3. The method of claim 1, wherein the pose is determined by additional averaging of the pose data.

4. The method of claim 1, wherein the reference depth image is a reference depth image taken from a predefined distance and/or position relative to the charging socket.

5. The method of claim 1, wherein the positional deviation is determined using an ICP algorithm.

6. The method of claim 1, further comprising:
digitizing the environment of the charging station as a digital map including a charging socket area in which the charging socket is located; and
modifying the digital map into a modified digital map without the charging socket area,
wherein the plugging the charging plug into the charging socket is performed based on the modified digital map.

7. A non-transitory computer-readable medium including a computer program, comprising instructions which cause an apparatus as to perform the method of claim 1.

8. The non-transitory computer readable medium of claim 7, wherein the image analysis is performed by a neural network pre-trained using data on position features of the charging socket.

9. The non-transitory computer readable medium of claim 7, wherein the pose is determined by additional averaging of the pose data.

10. The non-transitory computer readable medium of claim 7, wherein the reference depth image is a reference depth image taken from a predefined distance and/or position relative to the charging socket.

11. The non-transitory computer readable medium of claim 7, wherein the positional deviation is determined using an ICP algorithm.

12. An apparatus for autonomously moving and plugging a charging plug into a charging socket of a transportation vehicle, comprising:
a charging station with a programmable robot arm on which the charging plug (10) is installed;
a camera system mounted on the robot arm and configured for camera-based localization of the charging socket by image analysis of images of the charging socket and for creating a depth image of the charging socket indicating a current position when the charging plug has been moved to an intermediate position at a distance from the charging socket;
a computational unit for determining pose data for determining a pose of the localized charging socket using a PnP algorithm to analyze images of the charging socket; and
a comparison unit for performing a comparison between the created depth image and a reference depth image corresponding to a reference position to determine a positional deviation between a current position of the charging plug and the reference position,
wherein the charging plug is moved to the intermediate position based on the determined pose data, and
wherein the charging plug is moved to a plug-in position from the intermediate position of the charging plug based on the determined positional deviation so as to plug the charging plug into the charging socket.

13. The apparatus of claim 12, wherein the charging station is a mobile charging station.

14. The apparatus of claim 12, wherein the image analysis is performed by a neural network pre-trained using data on position features of the charging socket.

15. The apparatus of claim 12, wherein the pose is determined by additional averaging of the pose data.

16. The apparatus of claim 12, wherein the reference depth image is a reference depth image taken from a predefined distance and/or position relative to the charging socket.

17. The apparatus of claim 12, wherein the positional deviation is determined using an ICP algorithm.

*    *    *    *    *